No. 614,032. Patented Nov. 8, 1898.
P. A. SPICER.
PLOW.
(Application filed Dec. 11, 1896.)
(No Model.) 2 Sheets—Sheet 1.
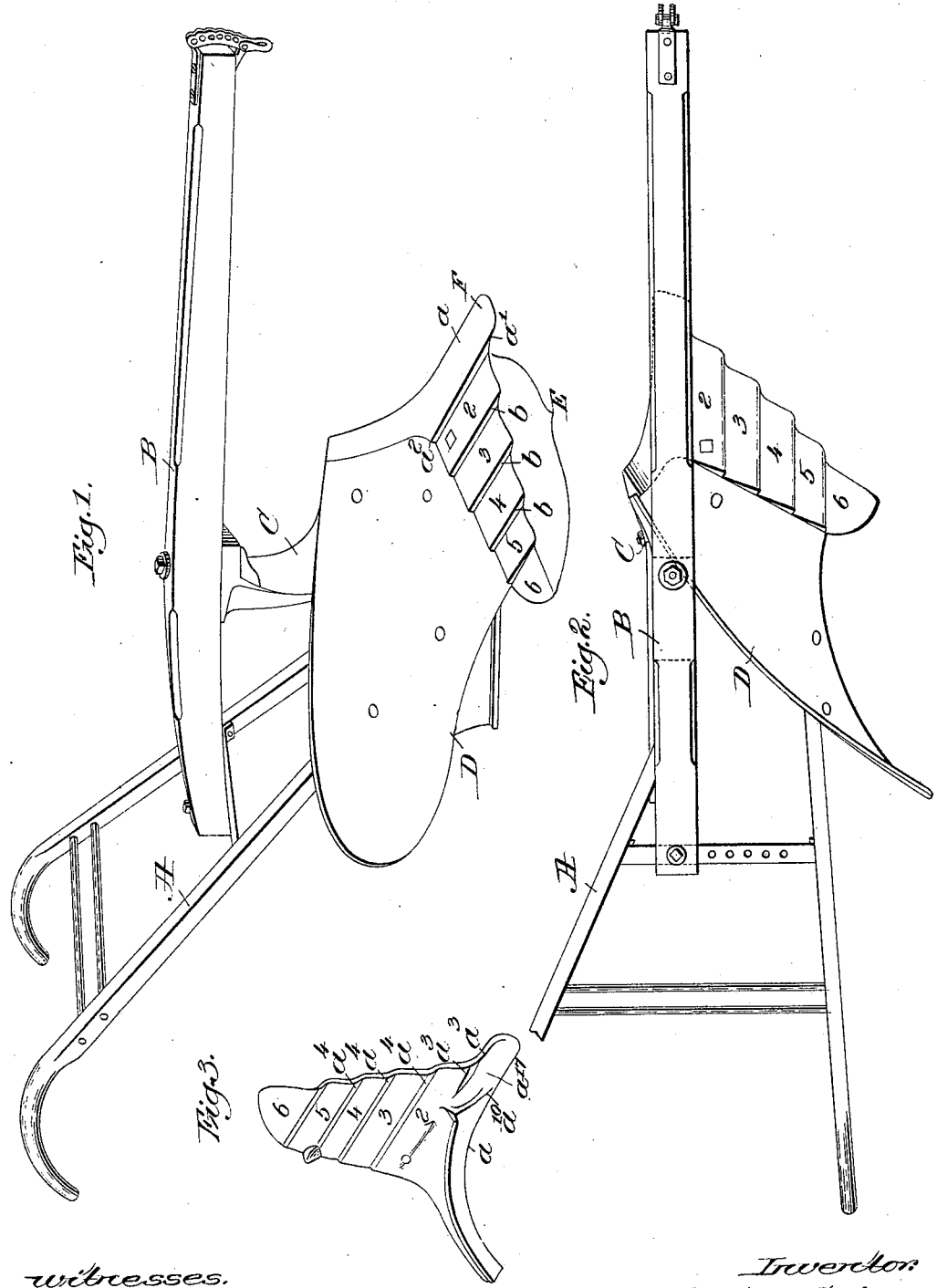
Witnesses.
Fred S. Greenleaf.
Edward F. Allen.
Inventor:
Pratt A. Spicer.
By Crosby Gregory
attys.

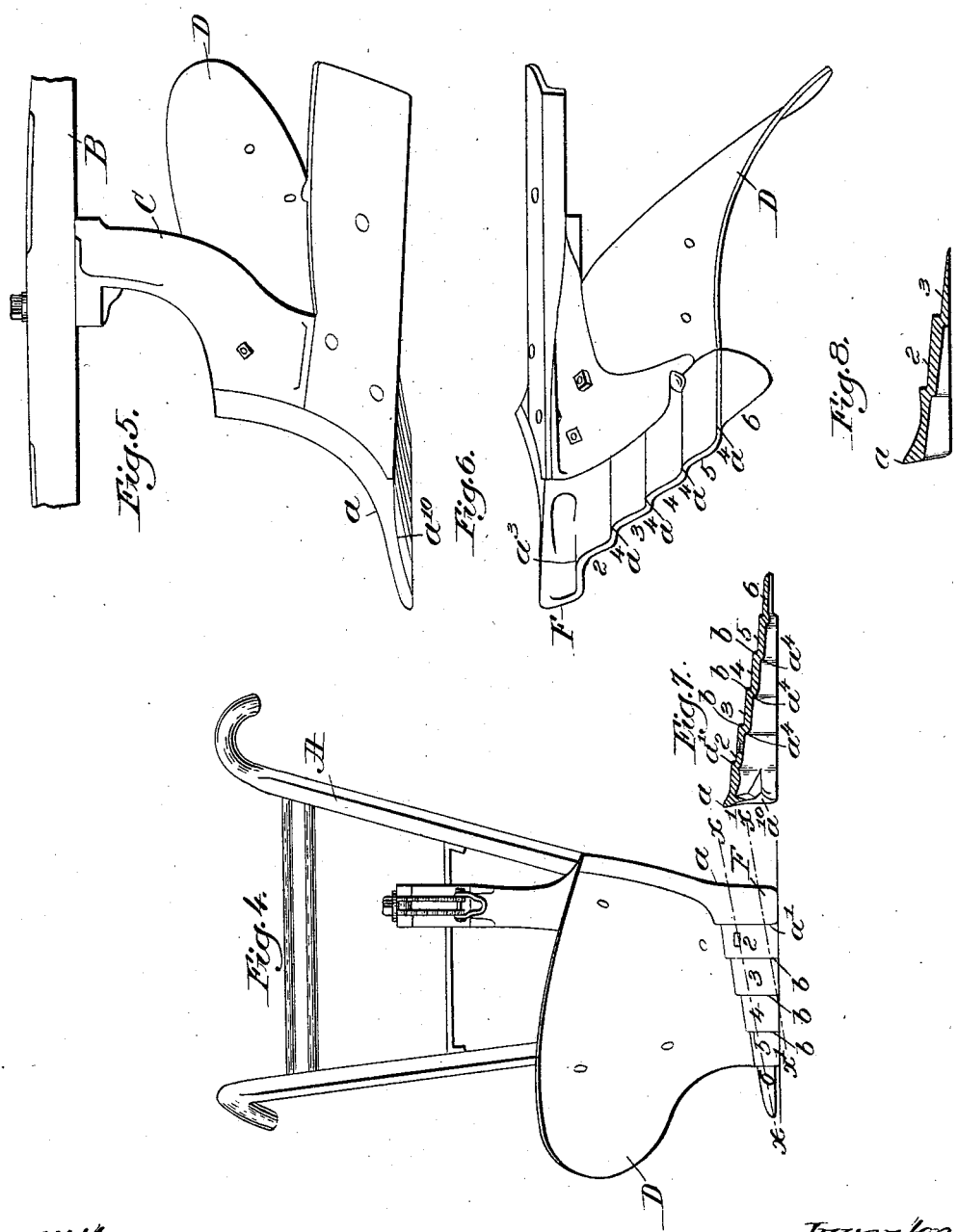

UNITED STATES PATENT OFFICE.

PRATT A. SPICER, OF MARSHALL, MICHIGAN.

PLOW.

SPECIFICATION forming part of Letters Patent No. 614,032, dated November 8, 1898.

Application filed December 11, 1896. Serial No. 615,331. (No model.)

*To all whom it may concern:*

Be it known that I, PRATT A. SPICER, of Marshall, county of Calhoun, State of Michigan, have invented an Improvement in Plows, of which the following description, in connection with the accompanying drawings, is a specification, like letters on the drawings representing like parts.

This invention has for its object the production of a novel share and point for a plow, my present invention being an improvement on the invention described in another application, Serial No. 590,519, filed by me on the 7th day of May, 1896. In that application the share and point presented at their top sides a series of concaved surfaces and at their under sides a series of convexed surfaces opposite the concaved surfaces, and the cutting edges of the share and point presented were of gouge-like shape. In this my present invention the top surface of the share and of the point taken together present a series of substantially plane or flat surfaces or sections located in slightly-different horizontal planes, said surfaces being separated one from the other by a shoulder-line substantially in the line of the draft of the plow, the width of each surface measured from shoulder to shoulder being substantially uniform. The cutting edges of the share next the point fall somewhat behind the cutting edge of the point, and each successive cutting edge of the share falls behind the one nearest it toward the point, but these cutting edges all fall to substantially the same horizontal plane. The under sides of the share and point present a series of shoulders substantially like those on the top side referred to, and the thicknesses of the cutting edges of the share and point are substantially the same from said edges backwardly for the distance to which it is practical to wear the share and point back by use; but the cutting edge of each of these sections preferably tapers a little, being thinner along the landside edge, for I have found in practice that the edge of each section farthest from the landside requires slightly more material in order to preserve the shape of the cutting edges of the sections as they move backward in wear. Where one section joins another section, I have dropped from the section next higher than it a flange-like lip or brace from the side of which projects the next lower section, said lips or braces uniting the cutting edges of the adjacent sections, as it were, in substantially the same horizontal plane, so that I get a cutting edge to act substantially in a straight line. The lip referred to constitutes the landside of the section next below it, and where the section joins said lip it is made thinner.

In a share having a series of sections such as referred to the section of the share next the point where it cuts into the soil finds the latter somewhat disturbed and loosened in the line of the junction of said section with the point, and each cutting edge of the share finds the soil next the section with which it is connected toward the point loosened in like manner, and this loosening of the soil by one section in advance of the action of the other section in the soil is one of the marked features of my present invention.

By making the under side of the share of substantially the same contour as the top side and the share of same thickness from its cutting edge back it is possible to make the share and point present the same thickness of cutting edge as the share wears back in use, as described. This would not be the case if the bottom of the share and point throughout the length of the share were flat and the top of the share was inclined upwardly from the cutting edges of the share at an angle to the bottom, for such gradual thickening of the share and point would soon, as the share became worn, present an edge so thick that the plow could not be used to advantage. By making the top surfaces of the sections referred to of the same contour throughout their length it is possible to prevent the clogging or wedging of the ground on the sections, and by making the top surfaces of the said sections substantially horizontal from the landside outwardly rather than at a downwardly-inclined plane, such as presented by an ordinary share, the tendency of the plow to crowd to land is sensibly decreased.

By the employment of my improved share and point the furrow-slice is severed by an edge which is substantially on an even plane, and the furrow-slice is constantly lifted onto the point and share and is shaped to conform thereto, and the furrow-slice is partially broken and is delivered to the moldboard with a flat shallow grooved under side which admits air between the furrow-slice and the moldboard, preventing suction on the moldboard, thus relieving or lessening the draft. Grooving the furrow-slice, as described, and delivering it on the moldboard, which as it in turn delivers the slice, substantially obliterates the grooves, and tends to crack and break up the soil, thus aiding any subsequent cultivation.

Figure 1 in side elevation represents a plow having a point and share embodying my present invention. Fig. 2 is a top or plan view thereof; Fig. 3, an under side view of the share and point; Fig. 4, a front elevation of the plow shown in Fig. 1; Fig. 5, a detail showing the inner or landside of the plow. Fig. 6 is an under side view of the plow standard, moldboard, share, and point. Fig. 7 is a section to the right of the line $x\ x$, Fig. 4; Fig. 8, a section of the point and part of the share on the line $x'$, Fig. 4, but enlarged.

The handles A, beam B, standard C, and moldboard D are and may be all of usual shape.

My improved share E and point F are of peculiar construction. The point presents a high edge $a$ at the landside, the top surface of the point being somewhat downwardly inclined to the inner edge of the point, where is presented a substantially vertical shoulder $a'$, preferably deeper nearer the cutting edge of the point than at the junction of the rear end $a^2$ of said shoulder with the moldboard, as shown in Fig. 1. The under side of the point from the edge $a$ at the landside is convexed at $a^{10}$, and then it presents a substantially flat surface $a^{17}$, with a depending lip $a^3$ extended from the cutting edge of the point backwardly, the outer side of the said lip constituting the shoulder $a'$ referred to.

As I have shown my invention in the drawings Figs. 1, 2, 3, and 6, the lip $a^3$ has cast integrally with it the landside of the front section 2 of the share, said share being herein shown as presenting four sections 2 3 4 5 and a wing 6. The cutting edge of the section 2 in practice will be located about three inches back of the cutting edge of the point, and the lip $a^3$ performs the important function of supporting the cutting edge of said section and placing the landside of that section in a lower plane than the under side of the main body of the point. Each section of the share is connected to a like web $a^4$ of the section toward the point, so that one side of each section in the top of the share shows a shoulder, as $b$, said shoulders lying in substantially the line of draft, the top surfaces of the sections lying one a little below the other in a different plane, the said surfaces being preferably substantially flat and preferably slightly wider at the end of the share where it meets the moldboard than at its cutting edge. These sections 2 3 4, &c., in the line $y$, Fig. 2, are shown as made slightly thinner near their junction at their landsides with the point or section of the share, this difference in thickness extending back substantially as far from the cutting edge of the section as the cutting edges of said sections may be worn back by wear and yet present a workable share. The cutting edges of these sections will preferably lie throughout in substantially the same horizontal plane, so that the furrow after the furrow-slice has been lifted will present a substantially horizontal bottom surface, the furrow-slice as it is lifted onto the top surface of the share and point so that the slice presenting the series of shoulders is in a measure broken or cracked as it is laid over, thus not only aiding in breaking up the soil, but also the air is readily admitted between the furrow-slice and the share at the shoulders, thus practically doing away with the clinging of the furrow-slice to the share and moldboard due to atmospheric pressure.

When my improved point and share are put in use, the point cuts a slice in the soil in advance of the section 2, so that when the cutting edge of said section arrives in line with the part of the soil lifted by the point said cutting edge finds the soil partly disturbed, and hence the landside portion of this cutting edge is not subjected to the same strain as the portion of said edge most remote from said landside, and to equalize the wearing of the cutting edge of each section I have increased the thickness of the said sections at their portions farthest from the landside.

The under side of the share presents a series of substantially horizontal faces and lips connecting said faces in a different plane. The top edge of the share herein shown meets the lower edge of the moldboard substantially as provided for in my said application, so that the upper ends of the shoulders referred to at the top surface of the share project above the surface of the moldboard to readily admit air.

By locating the top surfaces of the sections of the share in substantially horizontal planes and at different levels the tendency of the share to be crowded laterally toward the landside is materially decreased. The defined shoulders at the top surface of the share and point also aid in maintaining the movement of the plow in a straight line.

The top surfaces of the sections being of substantially the same area toward the moldboard, the soil coming thereon back of the cutting edge is not clogged on the sections, but is all delivered readily therefrom. The top surface of each section of the share at its landside is substantially in line with the under side of the section with which it is joined at the side farthest from the landside.

It is obvious that the width of the sections, the height of the shoulders, and the incline of the surface of the share from the side next the point outwardly and the amount of lead one cutting edge has over the next may be varied according to the requirements of the work and without altering my invention.

Having fully described my invention, what I claim, and desire to secure by Letters Patent, is—

1. A plowshare composed of a series of sections each having its landside edge joined with an adjacent section at its edge farthest from the landside by a shoulder, the shoulder between said sections extending entirely across said share from its cutting edge to an edge abutting the moldboard, substantially as described.

2. A plowshare having a series of sections lying in different planes, the upper and lower sides of said share being of like contour near the cutting edge of said share, substantially as described.

3. In a plow, the combination with a moldboard, of a share having a series of sections, each having its landside edge joined with an adjacent section at its edge farthest from the landside by a shoulder, said shoulders extending entirely across said share from its cutting edge to its edge abutting the moldboard, said shoulders also projecting above the top of the moldboard where it abuts the share, substantially as described.

4. A plowshare having a series of sections, each having its landside edge joined to a depending lip of the adjacent section at its edge farthest from the landside, leaving the tops of said sections in different planes, the upper and lower sides of said share being of like contour near the cutting edge of the share, substantially as described.

5. A plowshare having a series of sections, the top of one section being arranged substantially at the level of the bottom of the next section toward the landside, whereby the cutting edges of all the sections may be placed in substantially the same horizontal plane, substantially as described.

6. A plowshare having a series of sections in different planes, the cutting edges of said sections being located one with relation to the other to act as stated in substantially the same horizontal plane, substantially as described.

7. A plowshare having a series of sections located in different planes, the cutting edges of said sections being located one with relation to the other as stated, whereby the edge of each of said sections is adapted to cut the soil in a horizontal plane, substantially as described.

8. A plowshare having a series of sections presenting their top surfaces in different planes, each section of said series of sections in a line parallel with the cutting edges being thinner along the landside edges of each section than along the edges farthest from the landside, whereby the backward wear of the cutting edge may be kept uniform, substantially as described.

9. A plow-point presenting at its edge most remote from the landside a lip extended below its under surface, and a share having its cutting edge connected with said lip, substantially as described.

10. A plowshare having a series of sections, each having its landside edge joined to a depending lip extended below the bottom of the adjacent section at its edge farthest from the landside, leaving the top of said sections in different horizontal planes, the said sections being thinner along their landside edges than along their edges farthest from the landside, whereby the backward wear of the cutting edge may be kept uniform, substantially as described.

In testimony whereof I have signed my name to this specification in the presence of two subscribing witnesses.

PRATT A. SPICER.

Witnesses:
CHAS. LIFFLER, Jr.,
ALFRED M. ZIEGLER.